United States Patent [19]

Makino

[11] Patent Number: 5,423,036
[45] Date of Patent: Jun. 6, 1995

[54] SYSTEM FOR INTERACTIVE CHOICE OF EITHER AUTOMATICALLY USING THE FILE NAME FOR FILE ERASURE PROTECTION OR A MANUEL-INPUT CODE FOR FILE CONFIDENTIALLY PROTECTION

[75] Inventor: Yoshimi Makino, Yokohama, Japan

[73] Assignee: Matsushita Electric Industrial Co., Ltd., Osaka, Japan

[21] Appl. No.: 304,813

[22] Filed: Sep. 13, 1994

Related U.S. Application Data

[63] Continuation of Ser. No. 890,093, May 29, 1992, abandoned.

[30] Foreign Application Priority Data

Jun. 11, 1991 [JP] Japan .................. 3-139014

[51] Int. Cl.⁶ .................................. G06F 17/30
[52] U.S. Cl. ........................ 395/600; 380/4; 364/DIG. 1
[58] Field of Search ................. 395/600; 380/4

[56] References Cited

U.S. PATENT DOCUMENTS

| | | | |
|---|---|---|---|
| 4,866,707 | 9/1989 | Marshall et al. | 370/94.1 |
| 5,032,979 | 7/1991 | Hecht et al. | 395/575 |
| 5,052,040 | 9/1991 | Preston et al. | 380/4 |
| 5,062,039 | 10/1991 | Brown et al. | 395/425 |
| 5,263,165 | 11/1993 | Janis | 395/725 |
| 5,267,149 | 11/1993 | Anada et al. | 364/408 |
| 5,288,982 | 2/1994 | Hosdya | 235/454 |
| 5,289,540 | 2/1994 | Jones | 380/4 |

FOREIGN PATENT DOCUMENTS 2287765 11/1990 Japan .

OTHER PUBLICATIONS

Bishop, "Password Management", COMPCON '1991, 25 Feb.–1 Mar 1991, Digest of Papers, pp. 167–169.

Primary Examiner—Thomas G. Black
Assistant Examiner—Wayne Amsbury
Attorney, Agent, or Firm—Stevens, Davis, Miller & Mosher

[57] ABSTRACT

Provided is a code input apparatus for a computer or a word processor, in which determination is made whether a data file or a document file attached with a file name is prevented from being erroneously erased or from being kept in a confidence, and in the case of the prevention of erroneous erasure, the file name is directly used as a code for the file, but in the case of the prevention of keeping the file in a confidence, a code datum received by manual input is attached to the file, so that a time-consuming and laborious procedure in which a code for keeping a file in a confidence is attached to a file required to merely prevent the same from being erroneously erased can be eliminated, so that it is possible to prevent the file from falling into such a condition that the file cannot be opened.

6 Claims, 2 Drawing Sheets

CODE SETTING MODE

SELECT CODE SETTING MODE (1) AUTOMATIC    (2) MANUAL

NOTE: IF "AUTOMATIC" IS SELECTED, FILE NAME IS USED AS CODE

CODE NUMBER INPUT

INPUT SIX DIGIT CODE NUMBER

CODE NUMBER [*****]

SYSTEM FOR INTERACTIVE CHOICE OF EITHER AUTOMATICALLY USING THE FILE NAME FOR FILE ERASURE PROTECTION OR A MANUEL-INPUT CODE FOR FILE CONFIDENTIALLY PROTECTION

This application is a continuation of application Ser. No. 07/890,093, filed May 29, 1992 (abandoned).

BACKGROUND OF THE INVENTION

The present invention relates to an apparatus for a code input device for a computer or a word processor, and in particular, to an apparatus for attaching a code to a data file, a document file or the like which is prepared by a computer or a word processor in order to prevent such a file from being erroneously erased or being surreptitiously read.

DESCRIPTION OF RELATED ART

Conventionally, a data file, a document file or the like which is prepared by a computer or a word process has had a code or a pass word attached to it so as to prevent such a file from being erroneously erased or being surreptitiously read.

However, the respective purposes of prevention of erroneous erasure or surreptitious reading of a data file or a document file are essentially different from each other. That is, in the case of the prevention of erroneous erasure, it is not necessary to keep the content of a file in a confidence against the third party, but it is only necessary to prevent the file from being erroneously erased, and accordingly, a code attached to such a file is not required to be kept in confidence against the third party. On the contrary, in the case of the prevention of surreptitious reading of a file, the content of the file has to be kept in a confidence against the third party, and accordingly, a code attached to the file should be kept in a confidence.

However, in both file protection cases having different purposes, that is, the prevention of erroneous erasure and the prevention of surreptitious reading, a code has been conventionally attached to a file in a similar way. Accordingly, a code which is attached to a file in order to simply prevent the file from being erroneously erased has been prepared by a procedure in which a code can be hardly known to the third party. Thus, there have been raised such problems that the attachment of a code to a file is time-consuming, and that if the operator forgets the code, the file cannot be opened.

In order to solve the above-mentioned problems, Japanese Patent Unexamined Publication No. 2287765 proposes a document processing system in which a single document file is attached with two codes, that is, a fixed code inherent to the system and a user's password or a secret code, and the user's password can be derived from the fixed code even if the operator has forgotten the user's password. However, even with the system in the above-mentioned conventional art, since this fixed password is a code which is inherent throughout the entire system, so that it can be easily known, the user's password can be known from the thus known fixed code. Thus, this system is not preferable in the case of keeping a document file in a confidence.

SUMMARY OF THE INVENTION

The present invention is devised in order to solve the above-mentioned problems inherent to the prior art, and accordingly, one object of the present invention is to provide a code input apparatus for a computer or a word processor, in which a file name attached to a file is directly used as a code attached to the file for prevention of erroneous erasure, but a code datum received by manual input is used as a code attached to the file for prevention of surreptitious reading.

Accordingly, a code input apparatus for a computer or a word processor, according to the present invention, comprising a file name input means, a file name memory means for storing a file name which is received through the file name input means, a manual code data input means, a code input mode setting means for allowing an operator to select a manual code input mode in which a code is manually attached in order to keep a file in a confidence or an automatic code input mode in which the file name is automatically attached as a code to the file, a code input means for selecting a code datum which is manually attached through the manual code data input means or the file name which is stored in the file name memory means in accordance with a code input mode selected by the code input mode setting means so as to use the thus selected code datum or file name as a code to be attached to the file name, and a code memory means for storing a datum from the code input means.

BRIEF DESCRIPTION OF THE DRAWINGS

Explanation will be made of an embodiment of the present invention in detail with reference to the drawings in which.

DETAILED DESCRIPTION OF THE PREFERRED EMBODIMENT

Figures 1, 2, 3:
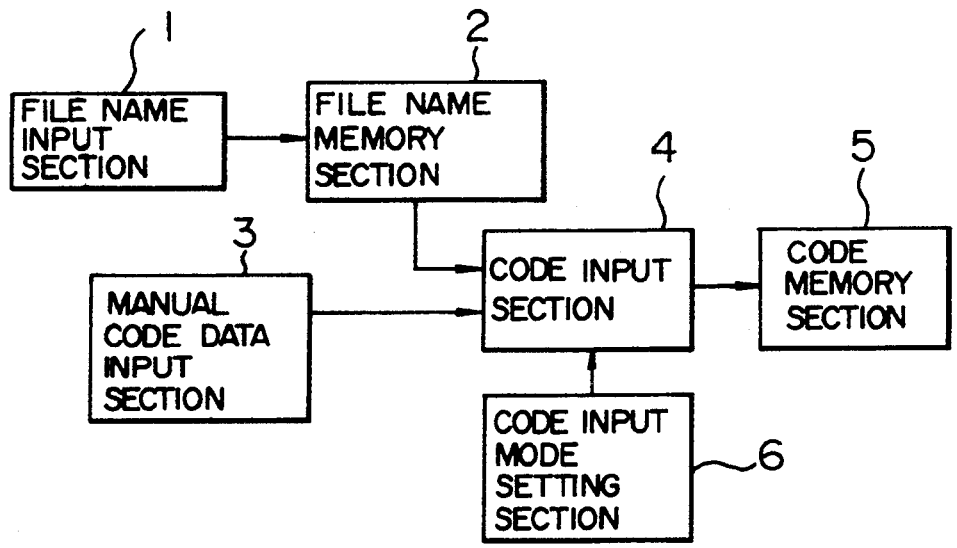
FIG. 1 is a block diagram showing an embodiment of the present invention.
FIG. 2 is a plan view illustrating a display screen given by a code input mode setting section 6 shown in FIG. 1.
FIG. 3 is a plan view illustrating a display screen given by a code input section 3.

FIG. 1 is a block diagram showing an arrangement of a code input apparatus in one embodiment form of the present invention.

During preparation of a data file, a document file or the like, a file name is received through a file name input section 1. The file name such as a file number or a document number is used as an identifier for identifying a file such as a computer program file, a computer data file, a document file to be prepared by a word processor, or the like.

The file name received through the file name input section 1 is stored in a file name memory section 2. Further, a code datum is manually attached through a manual code data input section 3 through manipulation of a key-board. Further, a code input mode setting section 6 allows the operator to determine whether the code datum attached by manual input through the manual code data input section 3 is specifically used as a code or not, and then delivers the result of the determination to a code input section 4 which delivers, in accordance with the result of the determination at the code input mode setting section 6, the code datum from the manual code input section 3 or the file name in the file name memory section 2, as a code, to a code memory section 5. That is, whether the code is set specifically through the manual input mode or is automatically set through the direct use of the file name is decided.

Figure 4:
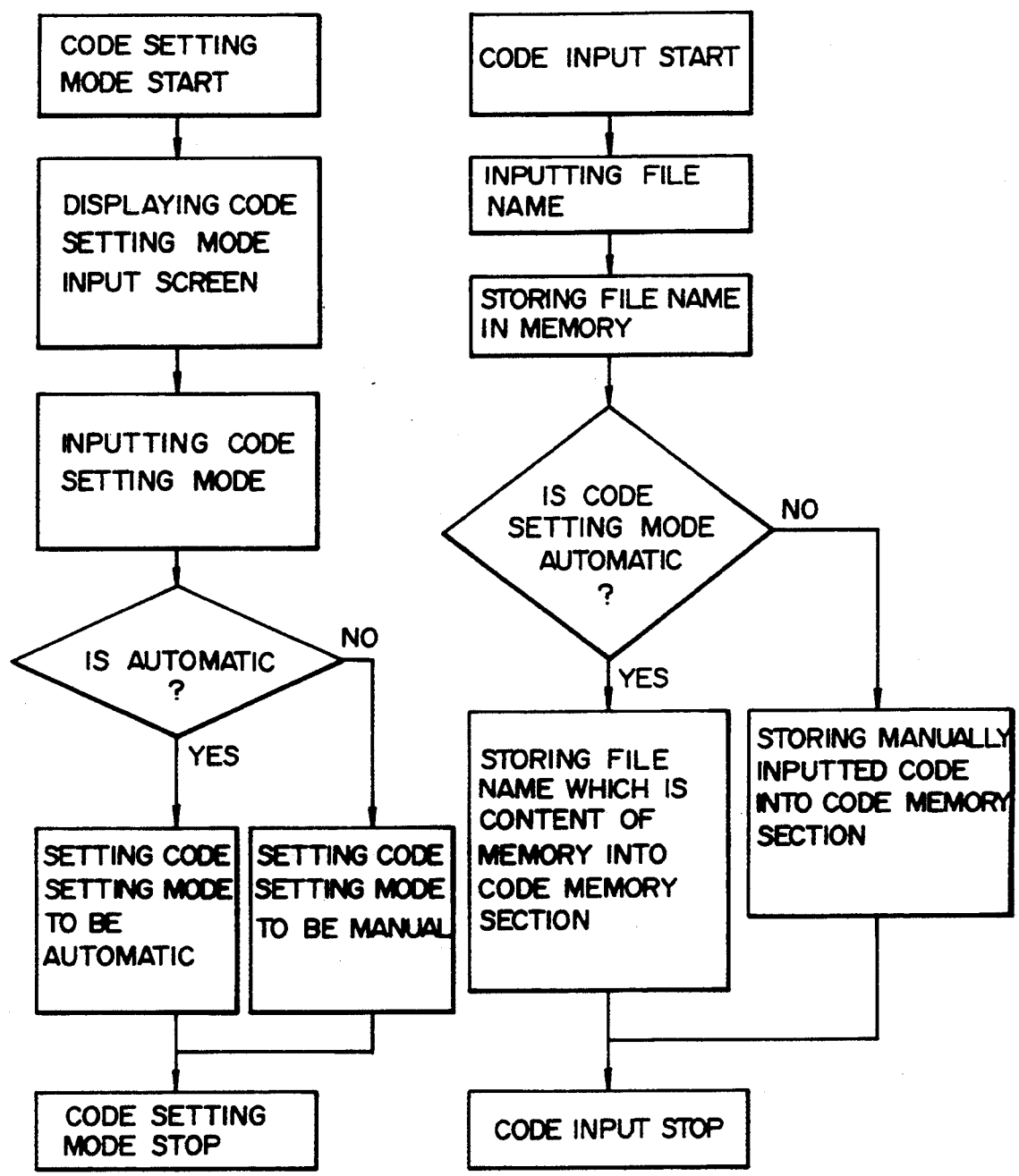
FIG. 4 is a flow-chart for explaining the steps of operation of the embodiment shown in FIG. 1.

Next, explanation will be made of the steps of operation of the code input apparatus according to the present invention with reference to FIGS. 2 to 4.

It is estimated that a data file having a file name "TEST" is prepared.

When the code input apparatus for a computer or a word processor is activated, a display screen given by the code input mode setting section 6 is displayed on a display unit, as shown in FIG. 2 (Step 1). According to the instruction on the display screen, "AUTOMATIC" or "MANUAL" is selected. That is, whether the code input mode is automatic or manual is set (Step 12). Further, the code input section 4 determines whether the set code input mode is automatic or manual (Step 13).

If the result of the determination gives the manual code input mode, the procedure is advanced to Step 14, and accordingly, the manual mode will be set up. If the result of the determination gives the automatic code input mode, the procedure is advanced to Step 15, and accordingly, the automatic mode is set up.

Further, the file name "TEST" which is received through the file name input section 1 (Step 21) is stored in the file name memory section 2 (Step 22). Next, the code input section 4 accesses the code input mode setting section 6 so as to determine whether the code input mode is automatic or manual (Step 23). If the result of the determination gives the automatic code input mode, the code input section stores the file name "TEST" as a code in the code memory section 5 (Step 24). Meanwhile, if the result of the determination gives the manual code input mode, a display screen shown in FIG. 3 is displayed on the display unit, and a code datum is received by keyboard entry through the manual code input section 3 and is then stored in the code memory section 5 (Step 25).

Subsequently, a document file having the file name "TEST" is prepared in a known manner, and the code stored in the code memory section 5 is attached to the file.

Although the present invention has been explained in one embodiment form, the present invention should not be limited to this embodiment form, but can be variously changed of modified within the spirit and the scope of the present invention which is defined only by the appended claims.

What is claimed is:

1. An apparatus for input of a code which is attached to a file to be prepared by a computer or a word-processor so as to prevent said file from being erroneously erased or to protect said file in a confidential condition, said apparatus comprising:
    a file name input means for receiving an input of a file name for said file;
    a first memory means for storing said file name received from said file name input means;
    a means for receiving a manual input of a code datum;
    a means for selecting one of a manual code input process or an automatic code input process;
    a determining means for determining whether said means for selecting has selected said manual input process or said automatic input process and for (i) selecting said file name as said code to be attached to said file when the automatic input process is selected and (ii) selecting said code datum as said code to be attached to said file when said manual input process is selected; and
    a second memory means for storing said code selected by said determining means in a manner wherein said code is attached to said file (i) to prevent said file from being erroneously erased when said file name is selected as said code and (ii) to protect said file in said confidential condition when said code datum is selected as said code.

2. An apparatus as in claim 1, wherein said means for receiving said manual input comprises means for displaying a message asking for said manual input of said code datum.

3. An apparatus as in claim 1, wherein said means for selecting comprises means for displaying a message asking for a manual input of a selection of said manual code input process or said automatic code input process.

4. A method of attaching a code to a file to be prepared by a computer or a word-processor so as to prevent said file from being erroneously erased or to protect said file in a secret condition, said method comprising:
    (a) receiving an input of a file name;
    (b) storing said file name in a first memory means;
    (c) selecting one of a manual code input process and an automatic code input process;
    (d) determining whether said manual code input process or said automatic code input process has been selected in step (c);
    (e) assigning said code to said file by (i) selecting said file name stored in said first memory means as said code to be attached to said file when said automatic input process is selected and (ii) receiving a manual input of a code datum and selecting said code datum as said code to be attached to said file when said manual input process is selected; and
    (f) storing said code in a second memory means in a manner so as to attach said code to said file to be prepared (i) to prevent said file from being erroneously erased when said file name stored in said first memory means is selected as said code in step (e) and (ii) to protect said file in said secret condition when said code datum is selected as said code in step (e).

5. A method as in claim 4, wherein step (e)(ii) comprises displaying a message asking for said manual input of said code datum.

6. A method as in claim 4, wherein step (c) comprises displaying a message asking for a manual input of a selection of said manual code input process or said automatic code input process.

* * * * *

UNITED STATES PATENT AND TRADEMARK OFFICE
CERTIFICATE OF CORRECTION

PATENT NO. : 5,423,036
DATED : June 6, 1995
INVENTOR(S) : Yoshimi Makino

It is certified that error appears in the above-indentified patent and that said Letters Patent is hereby corrected as shown below:

Title page, item [54], change title to read:

--SYSTEM FOR INTERACTIVE CHOICE OF EITHER AUTOMATICALLY USING THE FILE NAME FOR FILE ERASURE PROTECTION OR A MANUAL-INPUT CODE FOR FILE CONFIDENTIALITY PROTECTION-- (Item No. 54)

Signed and Sealed this

Twenty-fifth Day of July, 1995

Attest:

BRUCE LEHMAN

Attesting Officer

Commissioner of Patents and Trademarks